R. CROSS.
PROCESS OF TREATING PETROLEUM OIL.
APPLICATION FILED MAY 2, 1921.
1,423,500. Patented July 18, 1922.
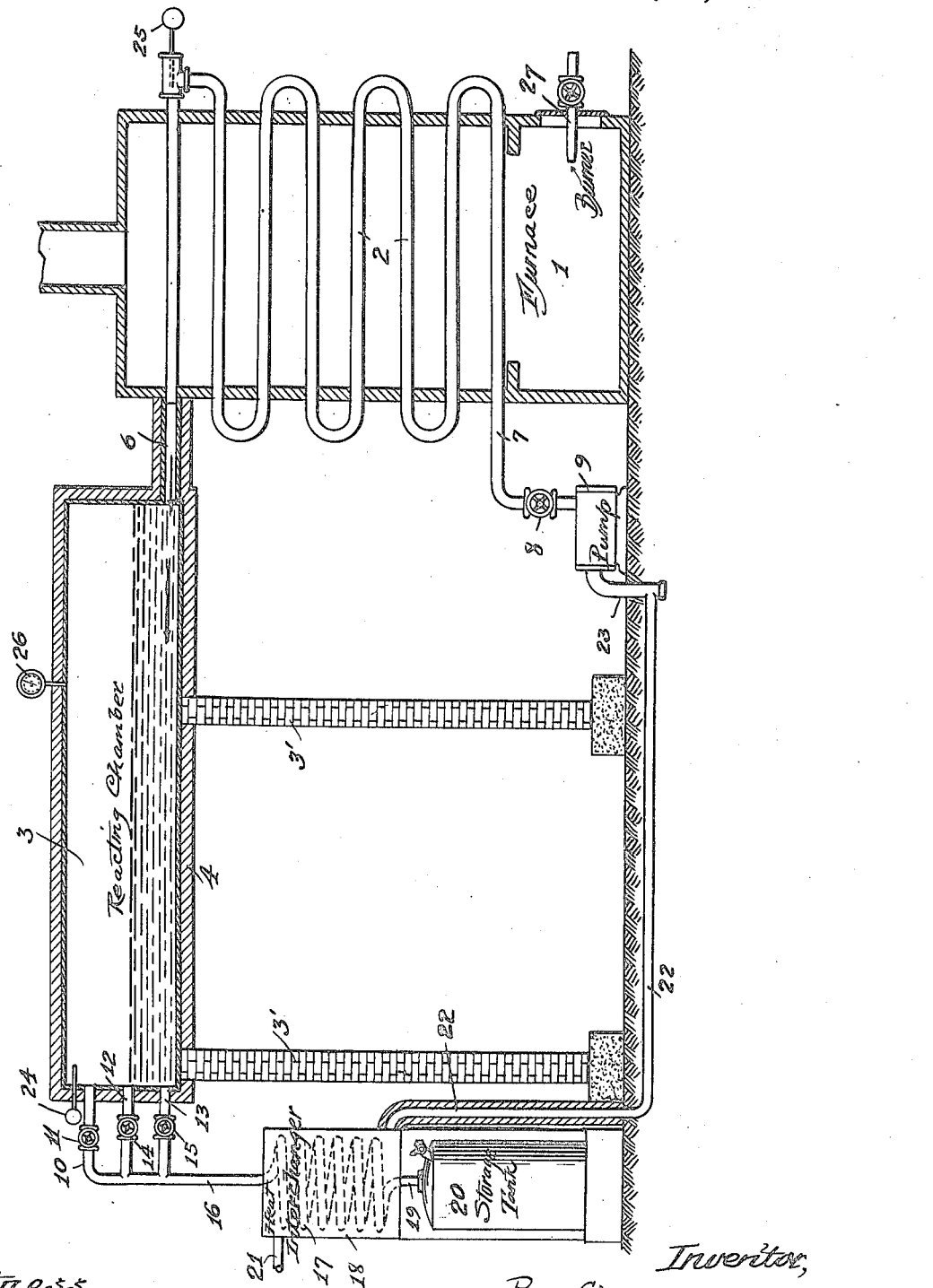
Inventor,
Roy Cross.
By Frank L. Belknap, Atty.
Witness,

UNITED STATES PATENT OFFICE.

ROY CROSS, OF KANSAS CITY, MISSOURI, ASSIGNOR TO GASOLINE PRODUCTS COMPANY, INC., OF NEW YORK, N. Y., A CORPORATION OF NEW YORK.

PROCESS OF TREATING PETROLEUM OIL.

1,423,500.   Specification of Letters Patent.   Patented July 18, 1922.

Continuation of application Serial No. 211,407, filed January 11, 1918. This application filed May 2, 1921. Serial No. 466,119.

*To all whom it may concern:*

Be it known that I, ROY CROSS, a citizen of the United States, residing in the city of Kansas City, county of Jackson, and State of Missouri, have invented certain new and useful Improvements in Processes of Treating Petroleum Oil, of which the following is a specification.

This invention relates to improvements in process for treating petroleum oils and more particularly refers to a process for making light hydrocarbon bodies, such as gasoline, naphtha and the like in which there is a conversion of hydrocarbons having a relatively high specific gravity to those having a lower specific gravity.

This application is a continuation of an original application filed by me January 11th, 1918, Serial No. 211,407.

Among the salient objects of the invention are to provide a process in which the heat, which is transmitted to the oil in the heating zone, is conserved and maintained in the body of the oil until such time as the oil has had an opportunity to react or attain a substantial equilibrium under the cracking temperature and pressure to which it is subjected; to provide a process in which the decomposition or reaction of the oil in the reacting zone produces an increased pressure, which assists in raising the boiling point of the oil and thereby promoting the decomposition of the oil; to provide a process that can be operated continuously and one that affords a more complete conversion of the oil body in that the temperature is not materially decreased in the reacting zone by such endothermic reactions as vaporization and radiation; to provide a process in which certain of the gases produced by the process, having a critical temperature below the cracking temperature of the charging stock, are intermittently or continuously removed from the reacting zone so as to prevent an excessive or unnecessary pressure in said reacting zone; to provide a process which is economical of operation in that the heat is more or less retained in the oil body during decomposition of the oil itself; to provide a process in which the heat from the gases and oils discharged from the reacting zone is utilized to preheat the fresh charging stock, which action also serves to cool such oil and gases and, in general, to provide an improved process of the character referred to.

The accompanying drawing shows a view partly in side elevation and partly in vertical section of an apparatus for carrying out the invention.

In the present invention the oil to be treated is fed continuously through a heating zone as, for example, through a continuous coil of pipe seated in a suitable furnace and there heated to the desired reacting temperature. The oil then in substantially liquid phase is passed to a reacting zone which may take the form of an enlarged chamber which is insulated from radiation and maintained under the same pressure as the oil in the heating zone. This pressure is maintained substantially uniform in both the coil tube and the reacting chamber 3 by reason of the accumulated gases in the upper part of the reacting chamber. The oil having been heated to a cracking temperature in the heating zone continues to react while in the reacting zone, such reaction taking place substantially in the liquid phase due to the high pressure maintained, although there will be formed some gases which may be such as methane, ethane, pentane, hexane, and other substances having a critical temperature below the cracking temperature of the oil under treatment. In other words, certain gases as formed by the cracking of the oil and should be removed from the system to prevent undue rise of pressure. There may also be entrained with these gases some small amount of condensable vapors. The bulk of the oil will be removed after the cracking reaction in the form of liquid or in a liquid phase.

This process is in no wise to be confused with the many distillation processes for cracking oil in which the light hydrocarbons are removed from the cracking zone in the form of vapors.

In the cracking of various kinds of oil, the pressure and temperature used will vary. For example, in the cracking of a mid-continent gas oil a pressure of 750 pounds per square inch has been found advantageous with an oil temperature of 700–800 degrees F.

Refer ng to the drawings—1 designates a furnace in which are mounted the heating tubes 2 through which the oil is passed. These tubes 2 may take the form of a continuous coil of four-inch pipe and may for example, be composed of, say, sixty tubes each twenty feet long. From the heating tubes the oil passes to the reacting chamber 3, which may take the form of a horizontal shell suitably supported as shown at 3' and insulated as shown at 4. This shell may take the form of a horizontal cylinder forty feet long and thirty inches in diameter. The apparatus should be capable of withstanding the desired pressure as, for example 750-1000 pounds, if so high a pressure is used. The oil passes in a substantially liquid condition through the insulated conduit 6 from the coil 2 to the chamber 3. Oil is supplied to the coil 2 through the feed line 7 having control valve 8 connected to the feed pump 9. At one end the reacting chamber 3 is provided with an incondensable gas outlet 10 controlled by throttle valve 11 and with liquid draw-off pipes 12 and 13 controlled by throttle valves 14 and 15 respectively. The treated oil containing a large quantity of gasoline and other low boiling point products may be given a distillation treatment, if desired, after which treatment the light oils are separated from the heavy residuum and precipitated carbon and the purified light oils such as fuel oil may be introduced with fresh oil to the system for treatment. The gases accumulating in the reacting chamber may be removed continuously or intermittently, it being necessary, however, in each instance that sufficient gases be retained within the upper part of said reacting chamber to exert a pressure which will serve to cause the oil to reassume its equilibrium. It will likewise be understood that while the gases that have the critical temperature below the boiling point of the main body of oil, largely consist of incondensible gases, although of course certain other gases of the oil which are condensible may mix therewith. The various pipes 10, 12 and 13 connect to a manifold pipe 16 leading to the coil 17 of a heat interchanger 18. The lower end of the coil is connected by pipe 19 to suitable receiver or storage tank 20. Raw oil is supplied to the pump 9 through the line 21 leading to any suitable source of charging stock. The raw oil is then passed through the heat interchanger 18 where it is preheated by the hot oil and gases passing through the coil 17 and thence delivered by insulated line 22 to the inlet pipe 23 of the charging pump 9. Suitable thermometers 24, 25 and pressure gauge 26 may be provided as well as the burner 27 for the furnace. It will be appreciated that the oil after being subjected to the cracking temperature in the coil 2 is transferred to the reacting chamber 3, which as before stated, is insulated, and in this chamber the oil is subjected to a pressure exerted thereon to permit the same to reassume an equilibrium.

For example, Kansas gas oil as it passes through the heating coil may be heated to a temperature of, say, 750 degrees F. more or less and the pressure gradually raised in the heating coil and reacting chamber to, say, 750 pounds per square inch. When this oil while at the temperature above defined is maintained in the reacting chamber under a pressure of 750 pounds per square inch by means of certain gases evolved from the oil no substantial vaporization of the heated oil takes place, the bulk of the oil reacting or cracking in a liquid phase, in which condition it is withdrawn as treated oil from the reacting chamber. The small quantity of the evolved gases which have a critical temperature below 750° F. maintain the high pressure on the reacting oil in its liquid phase and are discharged with the treated oil in such quantities as to always maintain a pressure in the reacting chamber sufficient to prevent vaporization of the bulk of the oil. It is apparent that if a high pressure is not maintained in the reacting chamber the bulk of the oil heated to this cracking temperature would vaporize, as commonly occurs in all distillation processes that must not be confused with this process which utilizes pressures always sufficiently high to prevent substantial vaporization of the oil. The level of the oil in the reacting chamber may be maintained to about the height of the pipe 12 and the pressure regulated by the withdrawal of the gases having a critical temperature below that of the cracking temperature. The oil is fed continuously through the system and about 30% of the oil will be converted into gasoline, more or less depending on the character of the raw oil being treated.

In an apparatus of the character referred to, the oil may be satisfactorily cracked to the extent indicated by remaining in the apparatus not to exceed, say, twenty minutes from the time it enters the heating coil until it leaves the reacting chamber. It is to be understood that the process is a continuous one and I wish to emphasize that the bulk of the gasoline and hydrocarbons formed at all times remains in liquid phase by reason of the conditions under which it is treated and substantially the bulk of the light hydrocarbons formed are removed from the system in liquid phase. It is, of course, to be understood that gases are formed which should be removed from the system, as stated, and also that some small amount of gasoline may either be entrained out with the gases or removed as vapor but nevertheless such vaporization is to be prevented as far as possible and is a rather incidental and inconsequential result of the operation of the process.

It is well known in the art that in ordinary distillation processes the vaporization and reflux condensation which takes place in such processes results in a very large heat loss which is eliminated in the present process.

I claim as my invention:

1. A continuous process of treating oil under pressure without substantial distillation consisting in passing oil in a relatively small stream through a heating zone where it is heated to a cracking temperature, in passing the oil in a substantially liquid phase while at a cracking temperature to an enlarged insulated reacting chamber located outside of the heating zone where further cracking takes place, in maintaining both the insulated reacting chamber and the heating zone under pressure of evolved gases of the oil that have a critical temperature below the cracking temperature, of the bulk of the oil said pressure being sufficient to prevent substantial vaporization of the oil, and in continuously removing said gases and the bulk of the treated oil in liquid phase from said reacting chamber.

2. A continuous process of treating oils under pressure without substantial distillation, consisting in passing the oil in a relatively small stream through a heating zone where the oil is heated to a cracking temperature, in discharging the oil from the heating zone in a substantially liquid phase and at a cracking temperature to an enlarged insulated reacting chamber located outside of the heating zone where further cracking takes place, maintaining the oil in both the enlarged insulated reacting chamber and the heating zone under pressure of evolved gases of the oil having a critical temperature below the cracking temperature of the bulk of the oil, said pressure being always sufficient to prevent any substantial vaporization of the oil, and in continuously removing the bulk of the oil in liquid phase and said pressure gases from said reacting chamber.

3. A continuous process for treating oils under pressure without substantial distillation consisting in passing the oil in a relatively small stream through a heating zone where the oil is heated to a cracking temperature, in transferring the oil while at a cracking temperature and in a substantially liquid phase from the heating zone to an enlarged insulated reacting chamber located outside of the heating zone, in maintaining the oil in the heating zone, and while in the enlarged insulated reacting chamber under pressure of evolved gases of the oil, said pressure being sufficient to prevent any substantial vaporization of the bulk of the oil, and in continuously removing treated oil and gases from the reacting chamber without distillation of said oil.

4. A continuous process for treating oils under pressure without distillation consisting in passing the oil in a relatively small stream through a heating zone where the oil is heated to a cracking temperature, in transferring the oil while at a cracking temperature and in a substantially liquid phase from the heating zone to an enlarged insulated reacting chamber located outside of the heating zone, in maintaining the oil in the heating zone, and while in the enlarged insulated reacting chamber under a substantially uniform pressure of evolved gases of the oil, said pressure being sufficient to prevent any substantial vaporization of the bulk of the oil, and in continuously removing treated oil and gases from the reacting chamber without returning said oil to the heating zone for retreatment.

5. A process of cracking petroleum oil without substantial distillation, which consists in passing the oil in a relatively small stream through a heating zone to be heated to a cracking temperature and thence to an enlarged insulated reacting chamber while the oil is at a cracking temperature, in maintaining the oil under pressure of evolved gases while in the heating zone and the enlarged reacting chamber, which pressure is sufficient to prevent a substantial vaporzation of the bulk of the oil in the heating zone and the reacting chamber during conversion of the heavier hydrocarbons into increased quantities of lighter hydrocarbons, and in discharging from the enlarged insulated reacting chamber gases and oil without again passing said discharged oil through the heating zone.

6. A process of cracking oil without substantial distillation, consisting in passing the oil in a relatively small stream through a heating zone to be heated to a cracking temperature, and thence to an enlarged insulated reacting chamber, in maintaining the oil in the heating zone and in the enlarged reacting chamber under a pressure of the evolved gases of the oil sufficient to prevent any substantial vaporization of the oil during conversion of the heavier hydrocarbons into increased quantities of lighter hydrocarbons while in the heating zone and the enlarged reacting chamber, and in discharging oil and gases from the enlarged insulated reacting chamber without again introducing the discharged oil to the heating zone.

7. A process of cracking oil without substantial distillation, comprising continuously passing oil in a small stream through a heating zone to be heated to a cracking temperature and then to an enlarged insulated reacting chamber, in subjecting the oil while in the heating zone and in the enlarged insulated reacting chamber to a pressure of evolved gases of the oil having a critical temperature below the cracking temperature, said pressure being sufficient to prevent substantial vaporization of the oil, in removing treated oils and gases from the enlarged insulated reacting chamber, and in collecting the treated oils without again passing said oils through the heating zone.

8. A continuous process of treating petroleum oils without substantial distillation, consisting in passing the oils in a relatively small stream through a heating zone and raising the same to a cracking temperature, directing the oil therefrom to a relatively large insulated reacting chamber and there maintaining the oil under sufficient pressure of evolved gases of the oil having a critical temperature below the cracking temperature of the bulk of the oil to prevent vaporization of the cracked hydrocarbons, introducing additional fresh oil to the heating zone, and drawing off the cracked liquid oil from the insulated reacting chamber without recirculation of the same through the heating zone while maintaining the temperature and pressure condition substantially uniform.

9. A continuous process of treating petroleum oil without substantial distillation consisting in passing the oil in a relatively small stream through a heating zone where it is raised to a conversion temperature, in introducing the oil to an enlarged insulated reacting zone and there maintaining the oil under pressure of the evolved gases of the oil to prevent vaporization of the heated hydrocarbons, in continuously withdrawing from the enlarged reacting zone sufficient cracked liquid oil and gases to maintain a constant level therein and uniform temperatures and pressures on the system and simultaneously introducing regulated quantities of fresh oil to the heating zone.

10. A continuous process of treating petroleum oil without substantial distillation, consisting in passing the oil in a relatively small stream through a heating zone where it is raised to a cracking temperature under a substantial pressure, then passing the oil to an enlarged insulated reacting zone and there permitting it to collect in a pool while maintaining the oil under pressure of the evolved gases of the oil having a critical temperature below the cracking temperature to prevent vaporization of the hydrocarbons, introducing fresh oil to the heating zone and drawing off cracked oil from the insulated reacting zone while maintaining the temperature and pressures through the system relatively constant.

11. A process of converting heavy petroleum hydrocarbons of substantially the same series without substantial distillation, consisting in bringing the hydrocarbons to a cracking temperature in a heating zone during the continuous passage of the hydrocarbons in a comparatively small stream through said zone, then passing the oil to an enlarged insulated reacting zone where no heat is applied, and in maintaining it in a relatively greater body in said reacting zone, the oil in both zones being subjected to pressure of the evolved gases of the oil having a critical temperature below the cracking temperature of the main body of oil, by means of which pressure substantial vaporization of the oil in both the heating and reacting zones is prevented during a conversion of the hydrocarbons, in removing treated hydrocarbons and gases from the enlarged insulated reacting chamber without returning said hydrocarbons to the heating zone for retreatment.

12. A process of converting heavy hydrocarbons into lighter hydrocarbons without substantial distillation, comprising passing oil in a small stream continuously through a heating zone to be heated to a cracking temperature, in then discharging the oil into an enlarged insulated reacting chamber wherein a substantial quantity of the heated oil accumulates, in maintaining the oil while passing through the heating zone and when in the enlarged insulated reacting chamber under pressure of evolved gases of said oil, said pressure being sufficient to prevent substantial vaporization of the bulk of the oil that is at a temperature above the cracking temperature, in withdrawing from the enlarged reacting chamber treated oil and pressure gases, and in collecting the treated oil without returning said oil to the heating zone for retreatment.

13. A process of converting petroleum hydrocarbons without substantial distillation consisting in directing the oil in comparatively small streams through the heating zone and raising it to a conversion temperature, passing the oil to an enlarged insulated reacting zone and there collecting it in a relatively greater body, permitting the oil to reassume an equilibrium therein by maintaining sufficient pressure upon the oil by evolved gases of the oil having a critical temperature below the cracking temperature of the main body of the oil to prevent any substantial vaporization, and in drawing off oil and a portion of the pressure gases from the enlarged reacting chamber without retreatment of said withdrawn oil.

14. A process of converting petroleum hydrocarbons without substantial distillation consisting in directing the oil in comparatively small streams through the heating zone and raising it to a conversion temperature, passing the oil to an enlarged insulated reacting zone and there collecting it in a relatively greater body, permitting the oil to reassume an equilibrium therein without the addition of heat to the reacting chamber by maintaining sufficient pressure thereon by evolved gases of the oil having a crictical temperature below the cracking temperature of the bulk of the oil to prevent any substantial vaporization, withdrawing the oil from the reacting chamber without retreatment thereof in the heating zone, and adding fresh untreated oil to the heating zone.

15. The process of continuously treating hydrocarbon oils without substantial distillation, which consists in introducing oil to a heating zone where the oil is heated in a relatively small stream to a cracking temperature, and in thence discharging the same to an enlarged insulated reacting chamber, in maintaining the oil under pressure of evolved gases while in the heating zone, and the enlarged insulated reacting chamber, which pressure is sufficient to prevent a substantial vaporization of the bulk of the heated oil in the heating zone and the reacting chamber during the conversion thereof, and in withdrawing treated oil and some of the pressure gases from the enlarged insulated reacting chamber without again returning said withdrawn oil to the heating zone for retreatment.

ROY CROSS.